United States Patent [19]

Shioya et al.

[11] 4,242,998
[45] Jan. 6, 1981

[54] ENGINE EXHAUST GAS RECIRCULATION SYSTEM

[75] Inventors: Toshio Shioya, Urawa; Hiroyuki Nishimura, Kounosu; Takashi Umemoto, Niiza, all of Japan

[73] Assignee: Honda Giken Kogyo Kabushiki Kaisha, Tokyo, Japan

[21] Appl. No.: 70,025

[22] Filed: Aug. 27, 1979

[30] Foreign Application Priority Data

Sep. 6, 1978 [JP] Japan .................. 53-108541
Sep. 6, 1978 [JP] Japan .................. 53-108542

[51] Int. Cl.³ .................. F02B 47/08; F02M 25/06
[52] U.S. Cl. .................. 123/568; 123/587
[58] Field of Search .................. 123/119 A, 124 R

[56] References Cited

U.S. PATENT DOCUMENTS

| 3,739,797 | 6/1973 | Caldwell | 123/119 A X |
| 3,779,222 | 12/1973 | Lorenz | 123/119 A |
| 3,818,880 | 6/1974 | Dawson et al. | 123/119 A |
| 3,884,200 | 5/1975 | Caldwell | 123/119 A |
| 3,915,136 | 10/1976 | Caldwell | 123/119 A |
| 3,970,061 | 7/1976 | Caldwell | 123/119 A |
| 4,033,308 | 7/1977 | Hayashi et al. | 123/119 X |
| 4,165,722 | 8/1979 | Aoyama | 123/119 A |
| 4,183,333 | 1/1980 | Aoyama | 123/119 A |

FOREIGN PATENT DOCUMENTS 1486093 9/1977 United Kingdom .
1486651 9/1977 United Kingdom .

Primary Examiner—Wendell E. Burns
Attorney, Agent, or Firm—Lyon & Lyon

[57] ABSTRACT

An exhaust gas recirculation system for an internal combustion engine employs a recirculation control valve in a passageway connecting the engine exhaust passage to the engine intake passage downstream from the throttle valve. An air conduit having an air control valve therein furnishes atmospheric air to the intake passage downstream from the throttle valve. Vacuum responsive actuators are provided for each of the control valves and they are operated by vacuum pressure regulated by a regulating valve, which regulating valve is responsive to differential pressure between vacuum intensity in the intake passage upstream from said throttle valve and modified atmospheric pressure. The modified atmospheric pressure is obtained downstream of a restriction in the air conduit.

4 Claims, 4 Drawing Figures

ENGINE EXHAUST GAS RECIRCULATION SYSTEM

This application is related to co-pending and co-assigned U.S. Pat. Application Ser. No. 9,370 filed Feb. 5, 1979 by Hiroyuki Nishimura, which is incorporated herein by this reference.

This invention relates to exhaust gas recirculation apparatus for internal combustion engines and is particularly directed to an improved control system for such apparatus.

It is desirable to recirculate exhaust gases to the engine intake passage substantially in proportion to intake flow of air to the engine. This is accomplished by the invention stated in the foregoing U.S. Pat. application.

It is also desirable to reduce the rate or recirculation during a light load operation of the engine, because in case of the exhaust gas being introduced with a mixture of air and fuel into a combustion chamber of engine, the higher the vacuum intensity is in the combustion chamber of the engine, the higher the vacuum intensity is in the intake passage downstream from the throttle valve, the more incomplete is the combustion. Furthermore, in order to decrease $No_x$ emission, it is desirable to overcome a tendency of the exhaust gas recirculation valve to be moved toward closed position immediately following full opening of the throttle valve in the intake for purposes of rapid acceleration.

The present invention meets these requirements by providing a exhaust gas recirculation control valve in a passageway connecting the engine exhaust passage to its intake passage downstream from the throttle valve. An air conduit having an air control valve therein furnishes atmospheric air to the engine intake passage downstream from the throttle valve. A regulating valve controls the operation of the control valve, and the regulating valve is responsive to differential pressure between the vacuum intensity in the intake passage upstream from the throttle valve and a modified atmospheric pressure obtained downstream from a restriction in the air conduit.

Other and more detailed objects and advantages will appear hereinafter.

Figure 1:
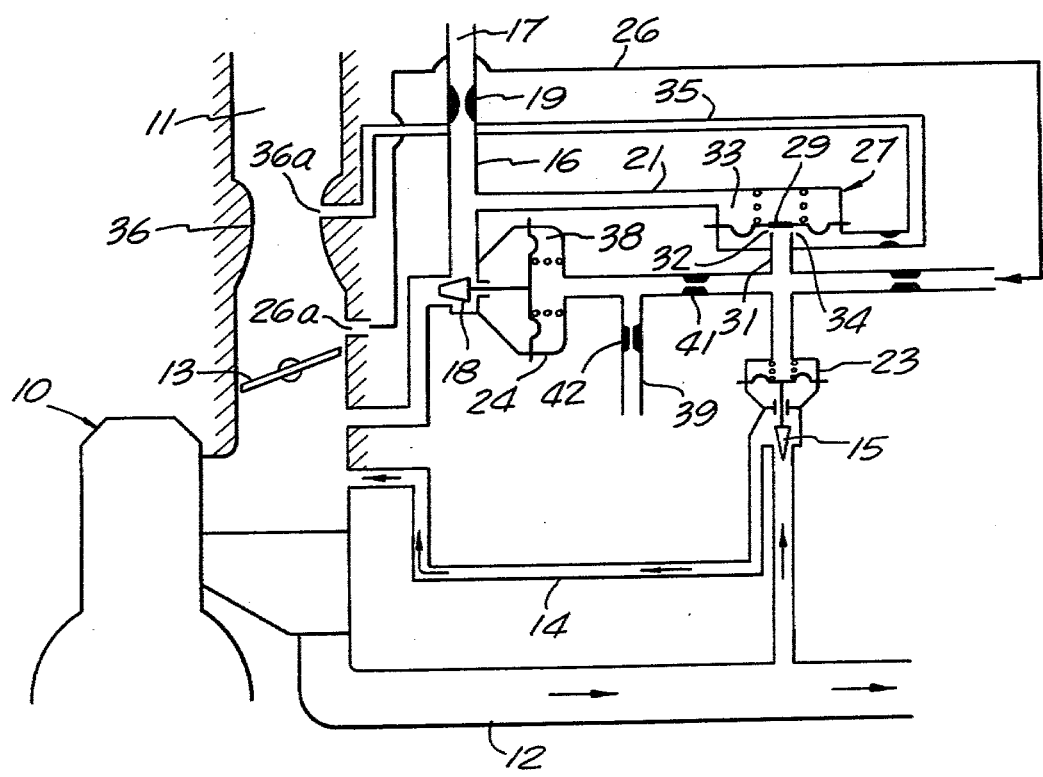
FIG. 1 is a schematic view showing a preferred embodiment of this invention.

Referring to the drawings, the engine 10 has an intake passage 11 for an air-fuel mixture, and a passage 12 for exhaust gases. A throttle valve 13 is provided in the intake passage 11. A passageway 14 connects the exhaust passage 12 to the intake passage 11 at a location downstream from the throttle valve 13, for recirculating exhaust gases into said engine 10. An exhaust gas recirculation control valve 15 is positioned in this passageway 14.

An air conduit 16 is connected to said intake passage 11 at a location downstream from said throttle valve 13 and has an opening 17 to atmosphere. An air control valve 18 is mounted in said air conduit 16. A restriction 19 is placed in the air conduit 16 at a location between the air control valve 18 and the opening 17 to atmosphere. An air control line 21 is connected to the air conduit 16 downstream with respect to said restriction 19. Each of the control valves 15 and 18 is provided with a vacuum responsive actuator 23, 24, respectively. Each of these actuators is connected to a control pipe system 26, which is in turn connected to a second vacuum outlet 26a in the intake passage 11 near the throttle valve 13.

A regulating valve 27 is provided with a movable diaphragm member 28 having a central non-flexible portion 29. An open ended tube 31 forming a part of the control pipe system 26 is closed and opened by contact with the central non-flexible portion 29 of the diaphragm member 28. A variable opening 32 is thus formed between the open ended tube 31 and the central portion 29 of the diaphragm member 28. The chamber 33 above the diaphragm member 28 of the regulating valve 27 is subjected to pressure in the air control line 21. The chamber 34 below the diaphragm member 28 is connected to a tube 35 which in turn is connected to a first vacuum outlet 36a in the carburetor venturi section 36. A vacuum induction passage 39 connected to a vacuum source is franched off from the vacuum passage 26. Restriction 41 and 42 are provide in each passage 26 and 29.

In operation, the operating vacuum generated at the second vacuum outlet 26a in the intake passage 11 acts on the vacuum responsive actuators 23 and 24 to open the exhaust gas recirculation control valve 15 and the air control valve 18. Exhaust gases from the exhaust passage 12 are then circulated back to the intake passage 11. The vacuum intensity in the air conduit 16 between the air control valve 18 and the orifice 19 acts on the regulating valve 27 to cause the central portion 29 of the diaphragm 28 to lift away from the valve port 32. Also the vacuum intensity in the first vacuum outlet 36a introduced into the second chamber 34 through the tube 35 acts on the regulating valve 27 to cause the diaphragm 28 to close the valve port 32. Thus, the action of the regulating valve 27 is regulated by means of both vacuum intensities in the air conduit 16 between the air control valve 18 and the orifice 19 and in the first vacuum outlet 36a in the venturi portion.

As the vacuum intensity at the first vacuum outlet 36a increases, the regulating valve 27 closes and acts to raise the vacuum pressure in the vacuum responsive actuators 23 and 24, with the result that the rate of flow of exhaust gas circulation also increases.

From the foregoing description, it will be understood that the operating vacuum from the intake passage acting on a control valve is regulated by a regulating valve placed in a passageway connecting the intake passage to atmosphere. The regulating valve responds in proportion to the engine load and therefore the control of introduction of gas is accomplished in a direct manner. The exhaust gas recirculation control valve and the air control valve operate synchronously with each other so that by measuring the rate of flow through the orifice leading to atmosphere and selecting the flow characteristics of the air control valve on the basis thereof, various rates of the additional gas flow introduced into an engine can be established.

Another vacuum is again employed for affecting the operation of the vacuum responsive actuator 24 for the air control valve 18. This additional vacuum is obtained from a vacuum source through the vacuum induction passage 39, whereby vacuum is introduced therethrough into the vacuum chamber 38 to move the air control valve 18 toward its open position. As a result, the vacuum in the air conduit 17 below the restriction 19 increases so that the regulating valve 27 moves to increase the leak rate through opening 32. This causes movement of the first control valve 15 toward closed position to reduce the exhaust recirculation rate.

Figure 2:
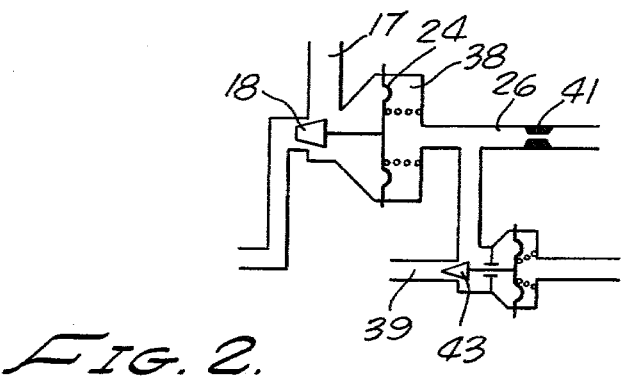
FIG. 2 is a fragmentary schematic diagram constituting a modification of the device of FIG. 1.

This system, for instance, may be utilized advantageously to adjust the recirculation rate in proportion to the intake vacuum of the engine. Furthermore, in this case, as shown in FIG. 2, for instance, a throttling valve 43 may be substituted for the restriction 42 in the vacuum induction passage.

It will be understood from the foregoing, in accordance with this invention, another vacuum can be introduced into the vacuum chamber of an air control valve placed in the conduit. By such an arrangement, the exhaust gas recirculation rate can be adjusted simply and easily.

Figure 3:
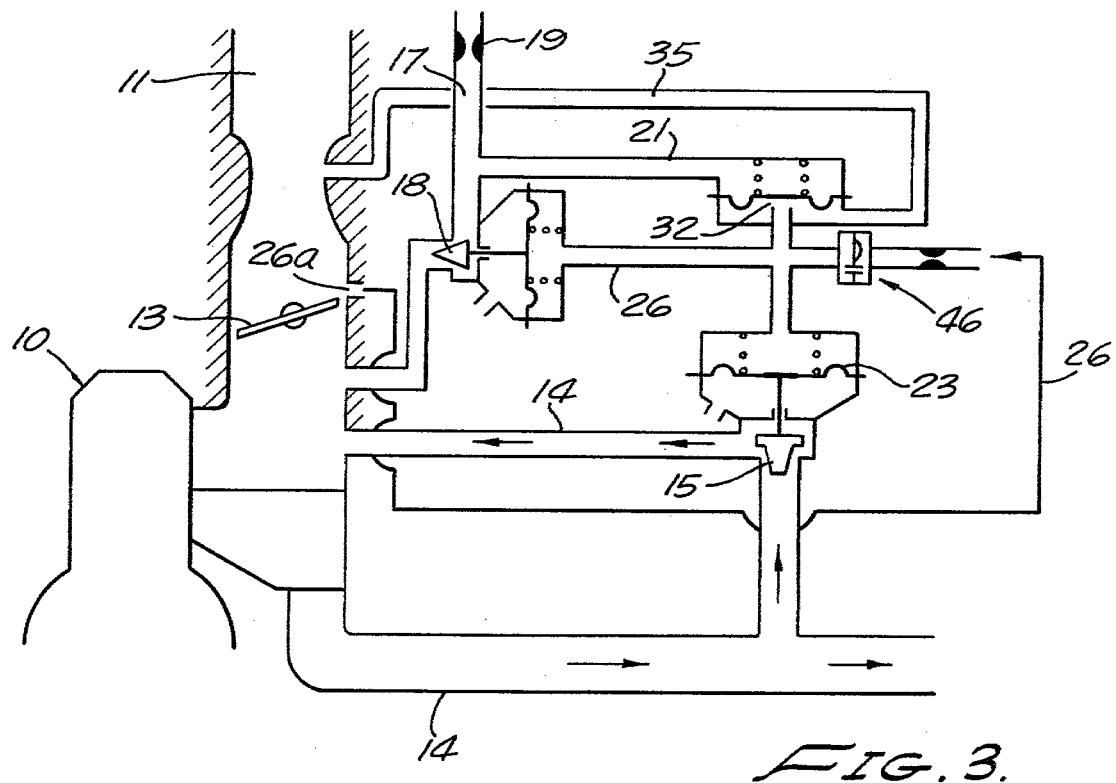
FIG. 3 is a view similar to FIG. 1 showing a further modification.
Figure 4:
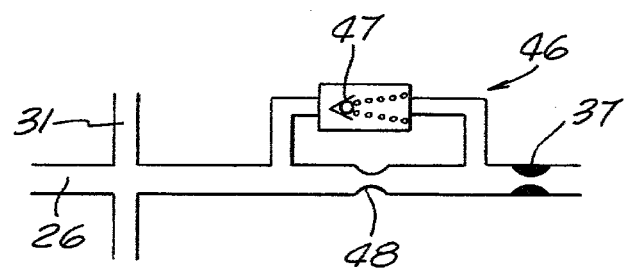
FIG. 4 is a fragmentary schematic diagram illustrating a portion of FIG. 3.

In the modified form of this invention shown in FIGS. 3 and 4, a delay valve assembly 46 is placed in the control pipe section 26 to prevent too rapid loss of vacuum intensity immediately following full opening of the throttle valve 13 for quick acceleration. A decrease in vacuum intensity in the control pipe system 26 causes the exhaust gas recirculation control valve 15 to move toward closed position. This may cause undesirable interruption in exhaust gas recirculation through the passage 14. In accordance with this invention, the delay valve assembly 46 includes a check valve 47 and an orifice 48 in parallel therewith. Fluid may pass through the orifice 48 in either direction but may pass through the check valve 47 only toward the right, as viewed in FIG. 4.

If the throttle valve 13 has been fully opened to provide quick acceleration of the engine 10, the intensity of the vacuum at the vacuum outlet 26a decreases in intensity. The delay valve assembly 46 in the control pipe system 26 delays loss of vacuum intensity by closing of the check valve 47 and requiring flow of fluid to the left to pass through the restricted orifice 48. In this way a previous, relatively intense vacuum is maintained for a short period of time in the vacuum chamber 33 of the exhaust gas recirculation control valve 15. The exhaust gas recirculation control valve 15 remains in its previous opening condition for continuation of the desired exhaust gas recirculation.

It will be understood from the foregoing that, in accordance with this form of the invention, a sudden reduction of vacuum intensity at the vacuum outlet 26a as a result of quick acceleration of the engine, is prevented from causing the recirculation control valve 15 to move toward closed position, by virtue of the existing vacuum in the chamber 33.

Having fully described our invention, it is to be understood that we are not to be limited to the details herein set forth but that our invention is of the full scope of the appended claims.

We claim:

1. In an internal combustion engine having an intake passage for delivering an air-fuel mixture into the engine, a throttle valve in the intake passage, and an exhaust passage for carrying exhaust gases from the engine, the improvement comprising, in combination: a passageway connecting the exhaust passage to the intake passage downstream from the throttle valve for recirculating exhaust gases into said engine, a first control valve in said passageway, an air conduit connecting said intake passage downstream from said throttle valve to atmosphere, a second control valve in said air conduit, each of said control valves having a vacuum responsive actuator, said air conduit having a restriction located between its opening to atmosphere and said second control valve, an air control line connected to said air conduit downstream with respect to said restriction, a vacuum line connected to said intake passage upstream from said throttle valve, a regulating valve responsive to differential pressure between vacuum pressure in said vacuum line and vacuum pressure in said air control line, a control pipe system connecting said vacuum responsive actuators to said intake passage near said throttle valve, means whereby said regulating valve acts through said control pipe system to act upon vacuum responsive actuators for said control valves.

2. The combination set forth in claim 1 in which said regulating valve has a variable opening for bleeding said control pipe system to said vacuum line.

3. In an internal combustion engine having an intake passage for delivering an air-fuel mixture into the engine, a throttle valve in the intake passage, and an exhaust passage for carrying exhaust gases from the engine, the improvement comprising, in combination: a passageway connecting the exhaust passage to the intake passage downstream from the throttle valve for recirculating exhaust gases into said engine, a first control valve in said passageway, an air conduit connecting said intake passage downstream from said throttle valve to atmosphere, a second control valve in said air conduit, each of said control valves having a vacuum responsive actuator, said air conduit having a restriction located between its opening to atmosphere and said second control valve, an air control line connected to said air conduit downstream with respect to said restriction, a vacuum line connected to said intake passage upstream from said throttle valve, a regulating valve responsive to differential pressure between vacuum pressure in said intake passage upstream from said throttle valve and vacuum pressure in said air control line, a control pipe system connecting said vacuum responsive actuators to said intake passage near said throttle valve, a restriction in said control pipe system, means including a check valve bypassing the latter said restriction to permit rapid application of intense vacuum to said actuators, and means whereby said regulating valve acts through said control pipe system to energize the vacuum responsive actuators for said control valves.

4. In an internal combustion engine having an intake passage for delivering an air-fuel mixture into the engine, a throttle valve in the intake passage, and an exhaust passage for carrying exhaust gases from the engine, the improvement comprising, in combination: a passageway connecting the exhaust passage to the intake passage downstream from the throttle valve for recirculating exhaust gases into said engine, a first control valve in said passageway, an air conduit connecting said intake passage downstream from said throttle valve to atmosphere, a second control valve in said air conduit, each of said control valves having a vacuum responsive actuator, said air conduit having a restriction located between its opening to atmosphere and said second control valve, an air control line connected to said air conduit downstream with respect to said restriction, a vacuum line connected to said intake passage upstream from said throttle valve, a regulating valve responsive to differential pressure between vacuum pressure in said vacuum line and vacuum pressure in said air control line, a control pipe system connecting said vacuum responsive actuators to said intake passage at a vacuum outlet near said throttle valve, means whereby said regulating valve acts through said control pipe system to act upon vacuum responsive actuators for said control valves, and a delay valve assembly in said control pipe system located between said vacuum outlet and said vacuum responsive actuators, said delay valve assembly having a restricted orifice and a check valve in parallel therewith, the check valve serving to prevent fluid flow from said vacuum outlet toward said vacuum responsive actuators.

* * * * *